United States Patent
Park

(10) Patent No.: US 11,750,077 B2
(45) Date of Patent: Sep. 5, 2023

(54) ELECTRONIC CLUTCH-COUPLED MOTOR ASSEMBLY AND DRIVING DEVICE FOR WASHING MACHINE HAVING SAME

(71) Applicant: LG Electronics Inc., Seoul (KR)

(72) Inventor: Yongsik Park, Seoul (KR)

(73) Assignee: LG Electronics Inc., Seoul (KR)

( * ) Notice: Subject to any disclaimer, the term of this patent is extended or adjusted under 35 U.S.C. 154(b) by 336 days.

(21) Appl. No.: 17/089,088

(22) Filed: Nov. 4, 2020

(65) Prior Publication Data
US 2021/0203218 A1   Jul. 1, 2021

(30) Foreign Application Priority Data
Dec. 26, 2019   (KR) .......................... 10-2019-0175609

(51) Int. Cl.
| | |
|---|---|
| *H02K 49/06* | (2006.01) |
| *H02K 49/10* | (2006.01) |
| *H02K 1/14* | (2006.01) |
| *H02K 1/16* | (2006.01) |
| *H02K 1/274* | (2022.01) |
| *H02K 7/11* | (2006.01) |
| *D06F 37/30* | (2020.01) |

(52) U.S. Cl.
CPC .......... *H02K 49/106* (2013.01); *H02K 1/148* (2013.01); *H02K 1/16* (2013.01); *H02K 1/274* (2013.01); *H02K 7/11* (2013.01); *D06F 37/304* (2013.01)

(58) Field of Classification Search
CPC ....... D06F 37/304; D06F 37/40; H02K 1/148; H02K 1/16; H02K 1/274; H02K 49/106; H02K 7/11
See application file for complete search history.

(56) References Cited

U.S. PATENT DOCUMENTS

| 2017/0029998 A1* | 2/2017 | Leany | .................... D06F 17/08 |
| 2019/0161900 A1* | 5/2019 | Park | ....................... D06F 37/40 |

FOREIGN PATENT DOCUMENTS

| CN | 104674507 | | 6/2015 | |
| JP | 59076155 A | * | 5/1984 | ............. H02K 1/185 |
| KR | 20090006868 A | * | 10/2009 | |
| KR | 101880091 | | 7/2018 | |
| WO | WO 2019205652 | | 10/2019 | |

OTHER PUBLICATIONS

EP Extended European Search Report in European Appln. No. 20208297.0, dated Jun. 4, 2021, 8 pages.

\* cited by examiner

*Primary Examiner* — Naishadh N Desai
(74) *Attorney, Agent, or Firm* — Fish & Richardson P.C.

(57) ABSTRACT

The present disclosure relates to an electronic clutch-coupled motor assembly and a driving device for a washing machine having the same. The electronic clutch-coupled motor assembly includes a motor including a stator defining a space having a predetermined size at an inner center thereof and a rotor spaced a predetermined distance from an outer circumference of the stator, disposed to surround the stator and configured to rotate, and an electronic clutch including an electronic clutch insert core having a circular shape and an electronic clutch bobbin fixed and coupled to an inside of the electronic clutch insert core, and press-fitted and coupled to the stator through the space and integrated with the stator.

18 Claims, 6 Drawing Sheets

<PRIOR ART>

<PRIOR ART>

ELECTRONIC CLUTCH-COUPLED MOTOR ASSEMBLY AND DRIVING DEVICE FOR WASHING MACHINE HAVING SAME

CROSS-REFERENCE TO RELATED APPLICATION

This application claims priority to and the benefit of Korean Patent Application No. 10-2019-0175609, filed in Korea on Dec. 26, 2019, the disclosure of which is incorporated herein by reference in its entirety.

TECHNICAL FIELD

Disclosed herein are an electronic clutch-coupled motor assembly and a driving device for a washing machine having the same.

BACKGROUND

A driving device for a washing machine includes a motor including a stator and a rotor, a clutch, gear components and the like.

A washing machine may be rotated by a motor where a rotating shaft is arranged perpendicularly, and objects to be rotate during washing, rinsing and dehydrating process differ.

Each component constituting the driving device for a washing machine connects to a shaft system to deliver power. Accordingly, it has to ensure concentricity.

In case concentricity is not ensured, performance of the motor may be deteriorated, and vibrations and/or noise of the gear components may increase. Additionally, the electronic clutch may operate incorrectly.

In the related art, an additional guide component (e.g., a plastic guide and the like) has been used to ensure concentricity of main components such as a motor, an electronic clutch and the like constituting a driving device for a washing machine.

Since a space in the driving device for a washing machine is too small, a component, which is made of a material such as thin plastics and the like and is manufactured through an injection molding process, has been used. However, such a component may be easily deformed. Accordingly, when the driving device for a washing machine is used for a long time, it is difficult to ensure and maintain concentricity of the driving device.

A driving device for a washing machine and a washing machine having the same are disclosed in Korean Patent No. 10-1880091—a prior art document. For the driving device for a washing machine, a lower portion of a mechanical clutch contacts an upper portion of a stator and is coupled to the same, and a part of the clutch is disposed to protrude towards an inside of the stator.

However, the driving device for a washing machine disclosed in Korean Patent No. 10-1880091 includes no electronic clutch. According to Korean Patent No. 10-1880091, the driving device has a reduced size, and its assembly process is simple. Additionally, the driving device may prevent moisture from permeating a Hall sensor assembly and collecting therein. However, any solutions to the problem associated with an operational error of the electronic clutch are not disclosed in Korean Patent No. 10-1880091.

FIG. 1 shows a driving device 1 for a washing machine of the related art, to which an electronic clutch is applied. The driving device 1 for a washing machine of the related art may include a motor 10 including a stator 11 and a rotor 12, an electronic clutch 20, a clutch 30, a sun gear 60, a sun gear shaft 61, a planetary gear 70, a planetary gear shaft 71 and a bearing housing 80.

The motor 10 may include a stator 11, and a rotor 12 surrounding the stator 11 and configured to rotate.

The electronic clutch 20 may include an electronic clutch core 21, an electronic clutch upper case 23 and an electronic clutch lower case 25.

To ensure concentricity of the electronic clutch 20, the bearing housing 80 and the stopper 30 are assembled, the electronic clutch 20 is assembled, and then the stator 11 is assembled. This is a cumbersome process.

Specifically, as illustrated in FIG. 2, the stopper 30, the electronic clutch upper case 23, the electronic clutch core 21, the electronic clutch lower case 25 and the stator 11 are consecutively assembled to a lower portion of the bearing housing 80 (see FIG. 1).

In the related art, the electronic clutch upper and lower cases 23, 25 are required to ensure concentricity of the electronic clutch 20. Accordingly, volume of the driving device 1 for a washing machine increases, and time and costs for assembly of the driving device 1 increase.

Additionally, for the driving device 1 for a washing machine of the related art, the electronic clutch 20 and the motor 10 are provided respectively with a power cable for supplying power to each of the electronic clutch 20 and the motor 10. Accordingly, it is difficult to keep the power cables neat and tidy.

PRIOR ART DOCUMENT

Patent Document

Korean Patent No. 10-1880091

SUMMARY

The present disclosure is directed to an electronic clutch-coupled motor assembly in which concentricity of an electronic clutch may be ensured when concentricity of a motor is ensured, based on a structure where an electronic clutch insert core is press-fitted and coupled to an inner center of a stator of the motor.

The present disclosure is directed to an electronic clutch-coupled motor assembly that may become lightweight, may ensure improvement in productivity and may help save costs, without an existing component used to ensure concentricity of an electronic clutch and work for ensuring concentricity with an additional jig.

The present disclosure is directed to an electronic clutch-coupled motor assembly in which a power delivery part may be modularized, based on an improved structure where an electronic clutch is integrated into a stator of a motor.

The present disclosure is directed to an electronic clutch-coupled motor assembly that may ensure a reduction in volume, may have a compact structure and may help save costs incurred for raw materials, based on a structure where electronic clutch cases formed at upper and lower portions of an electronic clutch are removed and where the electronic clutch is press-fitted and coupled to an inner center of a stator of a motor.

The present disclosure is directed to an electronic clutch-coupled motor assembly in which an electronic clutch and a stator of a motor may be integrated in a compact structure and may be supplied with power through a single power supply line instead of a power cable respectively for the electronic clutch and the stator of the motor.

The present disclosure is also directed to a driving device for a washing machine that may include the above-described electronic clutch-coupled motor assembly.

Aspects of the present disclosure are not limited to the above-described ones. Additionally, other aspects and advantages that have not been mentioned may be clearly understood from the following description and may be more clearly understood from embodiments. Further, it will be understood that the aspects and advantages of the present disclosure may be realized via means and combinations thereof that are described in the appended claims.

According to one aspect of the present disclosure, an electronic clutch-coupled motor assembly may have a structure in which an electronic clutch insert core is press-fitted and coupled to an inner center of a stator of a motor, thereby making it possible to ensure concentricity of an electronic clutch when concentricity of the motor is ensured.

According to one aspect of the present disclosure, an electronic clutch-coupled motor assembly may not require an existing component used to ensure concentricity of an electronic clutch and work for ensuring concentricity with an additional jig.

According to one aspect of the present disclosure, provided is an electronic clutch-coupled motor assembly in which a power delivery part may be modularized, based on an improved structure where an electronic clutch is integrated into a stator of a motor, and which may ensure a reduction in volume and may have a compact structure, based on a structure where electronic clutch cases formed at upper and lower portions of the electronic clutch are removed.

According to one aspect of the present disclosure, provided is an electronic clutch-coupled motor assembly in which an electronic clutch and a stator of a motor may be supplied with power through a single power supply line instead of a power cable respectively for the electronic clutch and the stator of the motor.

The electronic clutch-coupled motor assembly according to one embodiment may include a motor and an electronic clutch.

The motor may include a stator and a rotor. The stator may define a space having a predetermined size at an inner center thereof. The rotor may be spaced a predetermined distance from an outer circumference of the stator, may be disposed to surround the stator and may rotate.

The electronic clutch may include an electronic clutch insert core having a circular shape, and an electronic clutch bobbin fixed and coupled to an inside of the electronic clutch insert core.

The electronic clutch may be press-fitted and coupled to the stator through the space and may be integrated with the stator.

When being press-fitted into the stator through the space, the electronic clutch may be press-fitted into a plurality of portions formed at different positions in the stator at a time, and may ensure concentricity along with the motor. When concentricity of the motor is ensured, concentricity of the electronic clutch, press-fitted through the plurality of portions, may also be ensured. Thus, the concentricity of the electronic clutch may be readily ensured without a component (e.g., electronic clutch upper and lower cases) for ensuring concentricity of an electronic clutch of the related art and work for ensuring concentricity with a jig.

The stator may include a stator core disposed in a ring shape with the space at an inner center thereof, and a plurality of coils with which the stator core is provided.

The electronic clutch-coupled motor assembly may include a first press-fit part that contacts an inside of the electronic clutch insert core in a radial direction thereof and the stator core and is press-fitted therebetween, at the time of a press fit between the electronic clutch and the stator.

The electronic clutch-coupled motor assembly may include a second press-fit part that contacts an outside of the electronic clutch insert core in the radial direction thereof and the stator core and is press-fitted therebetween, at the time of a press fit between the electronic clutch and the stator.

In this case, the first press-fit part and the second press-fit part may be disposed to face each other in the electronic clutch insert core, with the electronic clutch bobbin therebetween.

The electronic clutch-coupled motor assembly may further include a cover that closes an open portion of the space and is coupled to the stator, to fix a position of the electronic clutch after the press fit between the electronic clutch and the stator.

The cover may be coupled to the stator core using at least one bolt. In this case, the bolt may be coupled through at least one coupling groove formed inside the stator core near the second press-fit part.

The rotor may include a rotor core disposed to surround the stator with an air gap between the rotor and the stator, and a plurality of magnets disposed to face coils of the stator inside the rotor core.

The space may have a height corresponding to a height of the electronic clutch.

The electronic clutch may be entirely stored in the space and may be surrounded by the stator when it is press-fitted into the stator.

The electronic clutch-coupled motor assembly may further include a power connector that is coupled through the stator core to supply power to the motor and the electronic clutch.

According to another aspect of the present disclosure, provided is a driving device for a washing machine that may include an electronic clutch-coupled motor assembly in which when concentricity of the motor is ensured, concentricity of the electronic clutch is also ensured, based on a structure where the electronic clutch insert core is press-fitted and coupled to the inner center of the stator of the motor.

The driving device for a washing machine according to one embodiment may include a motor, an electronic clutch, a sun gear shaft, a sun gear, a planetary gear and a planetary gear shaft.

The motor may include a stator defining a space having a predetermined size at an inner center thereof, and a rotor spaced a predetermined distance from an outer circumference of the stator, disposed to surround the stator and configured to rotate.

The electronic clutch may include an electronic clutch insert core having a circular shape, and an electronic clutch bobbin fixed and coupled to an inside of the electronic clutch insert core.

The electronic clutch may be press-fitted and coupled to the stator through the space and may be integrated with the stator.

The sun gear shaft may receive rotational force from the motor to rotate. The sun gear may be coupled through an upper end of the sun gear shaft. A plurality of planetary gears may be disposed to surround an outside of the sun gear. The planetary gear shaft may receive rotational force from the planetary gear to rotate.

The driving device for a washing machine may further include a first press-fit part that contacts an inside of the electronic clutch insert core in a radial direction thereof and the stator core and is press-fitted therebetween, at the time of a press fit between the electronic clutch and the stator, and a second press-fit part that contacts an outside of the electronic clutch insert core in the radial direction thereof and the stator core and is press-fitted therebetween, at the time of a press fit between the electronic clutch and the stator.

The driving device for a washing machine may further include a cover that closes an open portion of the space and is coupled to the stator, to fix a position of the electronic clutch after the press fit between the electronic clutch and the stator. The cover may be coupled to the stator core using at least one bolt, and the bolt may be coupled through at least one coupling groove formed inside the stator core near the second press-fit part.

The driving device for a washing machine may further include a plurality of stoppers that is connected and coupled between the stator and a bearing housing of a washing machine through the stator core.

According to the present disclosure, when concentricity of the motor is ensured, concentricity of the electronic clutch may also be ensured, based on the structure where the electronic clutch insert core is press-fitted and coupled to the inner center of the stator of the motor.

According to the disclosure, an existing component used to ensure concentricity of the electronic clutch may be removed. Additionally, work for ensuring concentricity with an additional jig may not be required. Thus, the motor assembly and the driving device for a washing machine may become lightweight, may ensure improvement in productivity and may help save costs.

According to the disclosure, a power delivery part may be modularized, based on the improved structure where the electronic clutch is integrated into the stator of the motor.

According to the disclosure, electronic clutch cases formed at upper and lower portions of an electronic clutch may be removed, and the electronic clutch may be press-fitted and coupled to the inner center of the stator of the motor. Thus, the motor assembly and the driving device for a washing machine may ensure a reduction in volume, may have a compact structure and may help save costs incurred for raw materials.

According to the disclosure, the electronic clutch and the stator of the motor may be integrated in a compact structure. Thus, power may be supplied to the electronic clutch and the stator of the motor through a single power supply line instead of a power cable respectively for the electronic clutch and the stator of the motor.

Detailed effects are described along with the above-described effects in the detailed description of the disclosure.

BRIEF DESCRIPTION OF DRAWINGS

The accompanying drawings constitute a part of this specification, illustrate one or more embodiments of the present disclosure, and together with the specification, explain the present disclosure, wherein.

DETAILED DESCRIPTION

Figure 1:
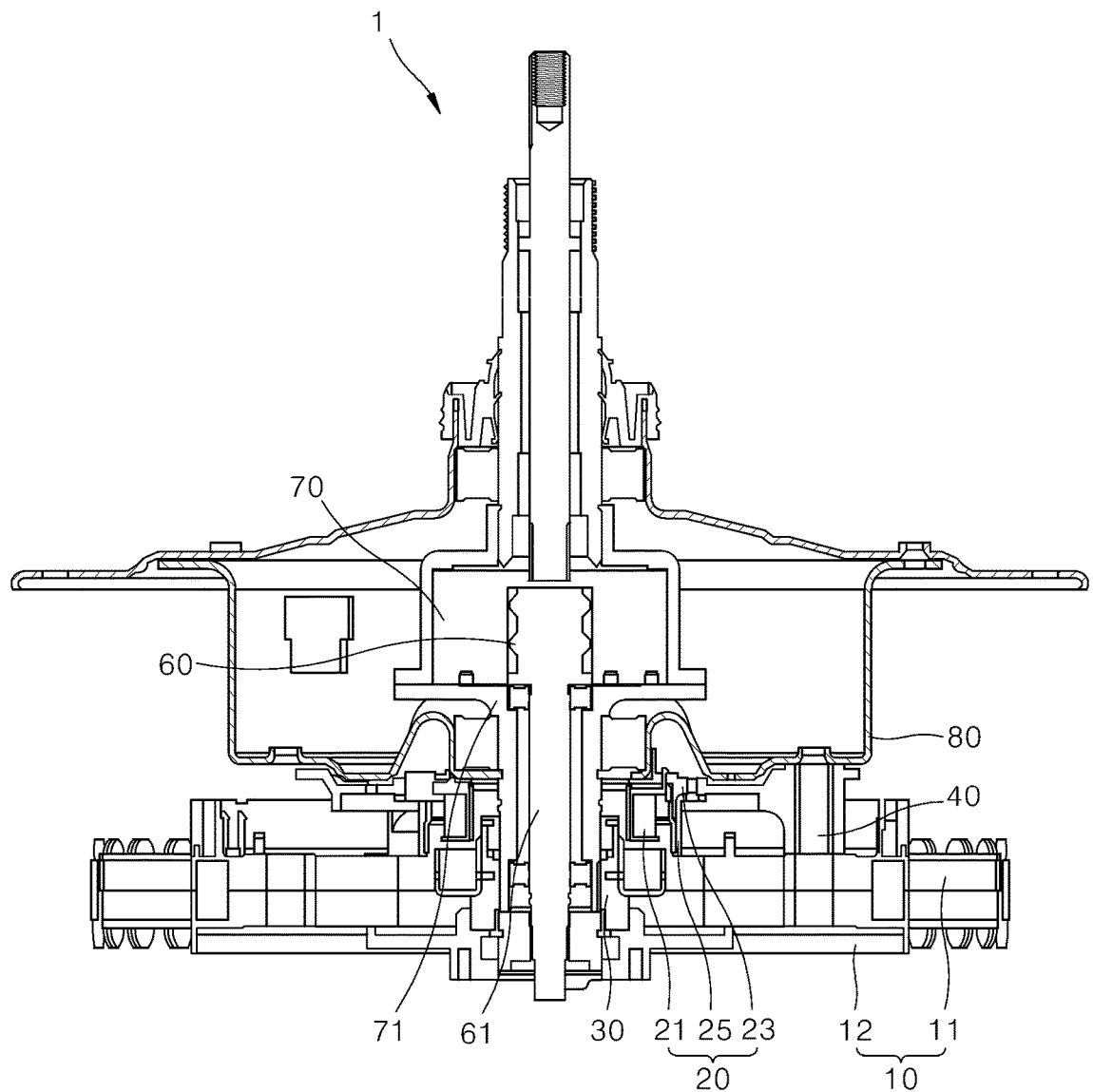
FIG. 1 is a schematic cross-sectional view illustrating a driving device for a washing machine of the related art.

Below, embodiments are described with reference to accompanying drawings such that one having ordinary skill in the art to which the present disclosure pertains readily implements the embodiments. However, the embodiments may be implemented in various different forms. Additionally, the disclosure is not intended to limit the embodiments.

For clarity of description, details irrelevant to the disclosure are omitted, and throughout the disclosure, like reference numerals denote like components. Additionally, some embodiments are described with reference to the drawings. Like components in each drawing may be given like reference numerals although they are illustrated in different drawings. Further, detailed description of well-known functions and configurations in relation to the disclosure is omitted if it is deemed to make the gist of the disclosure unnecessarily vague.

During description of the components in the disclosure, when any one component is described as being "connected," "coupled" or "connected" to another component, any component may be directly connected or may be able to be directly connected to another component; however, it is also to be understood that an additional component may be "interposed" between the two components, or the two components may be "connected", "coupled" or "connected" through an additional component.

Figure 3:
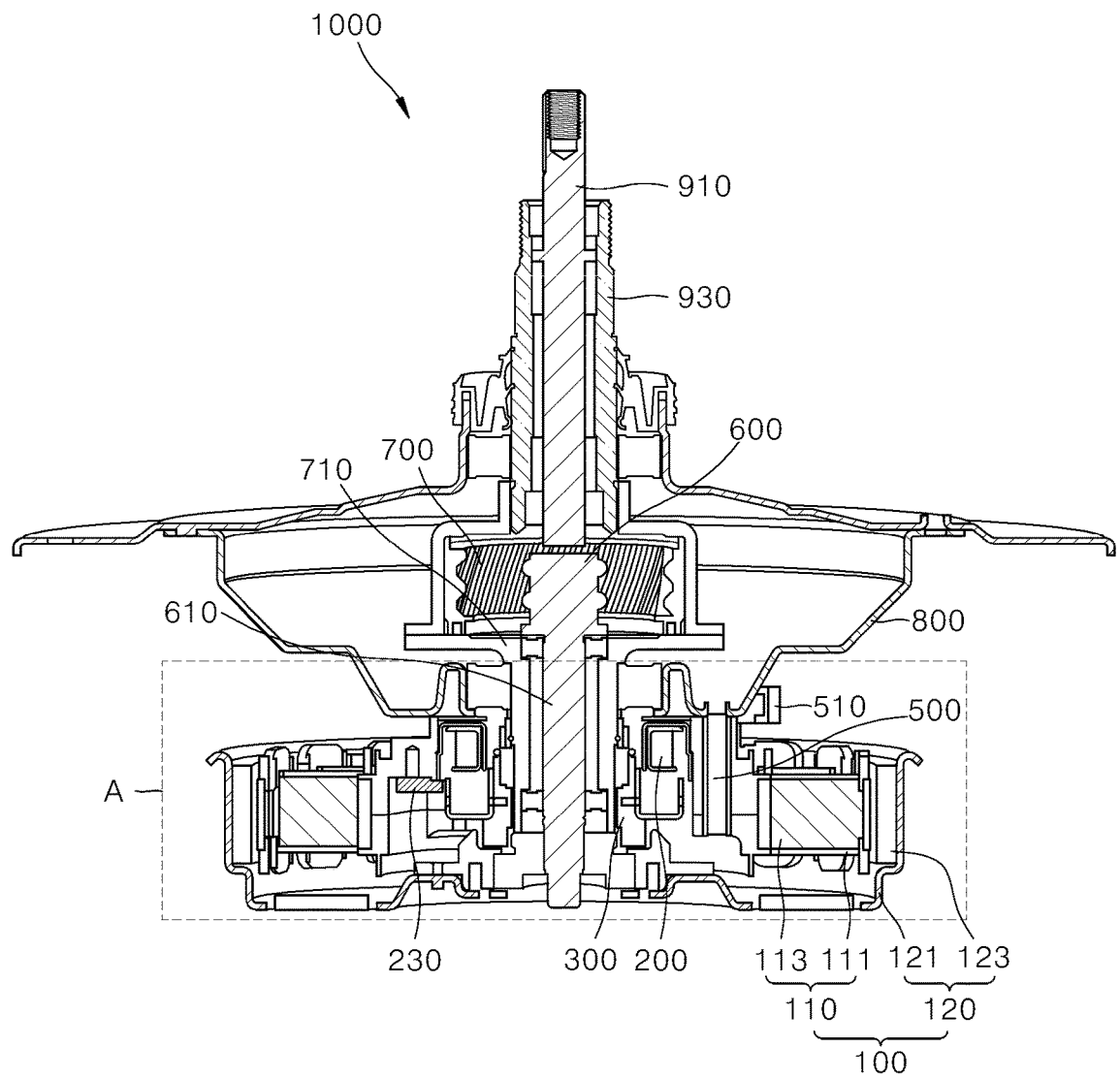
FIG. 3 is a schematic cross-sectional view illustrating an example driving device for a washing machine.

FIG. 3 is a schematic cross-sectional view illustrating an example driving device for a washing machine.

The example driving device 1000 for a washing machine may include a motor assembly having a structure in which an electronic clutch 200 is press-fitted and coupled to an inner center of a stator 110 of a motor 100 such that the motor 100 and the electronic clutch 200 are integrated.

Accordingly, as long as concentricity of the motor 100 is ensured, concentricity of the electronic clutch 200 may also be ensured without additional work.

The driving device 1000 for a washing machine, as illustrated, may include a motor 100, an electronic clutch 200, a sun gear shaft 610, a sun gear 600, a planetary gear 700, and a planetary gear shaft 710.

The motor 100 may include a stator 110 and a rotor 120.

The stator 110 may define a space (a circular space into which the electronic clutch 200 is press-fitted) having a predetermined size, at an inner center thereof.

Specifically, the stator 110 may include a stator core 111 and a plurality of coils 113.

The stator core 111 may have a ring shaped-structure in which the stator core 111 is disposed to surround the space at the inner center of the stator 110.

The plurality of coils 113 may be arranged through the stator core 111 in a predetermined direction.

The rotor 120 may be spaced a predetermined distance from an outer circumference of the stator 110 and may be disposed to surround the stator 110.

Specifically, the rotor 120 may include a rotor core 121 and a plurality of magnets 123.

The rotor core 121 may be formed to surround the stator 110 with a predetermined-sized gap, i.e., an air gap, between the rotor core 121 and the stator 110.

The plurality of magnets 123 may be arranged to face the coils 113 of the stator 110 inside the rotor core 121 with the air gap between the magnets 123 and the coils 113 of the stator 110.

With the configuration, when power is supplied to the stator 110, electromagnetic force may be generated between the coils 113 included in the stator 110 and the magnets 123 included in the rotor 120. Accordingly, the rotor 120 may rotate around the stator 110.

Figure 4:
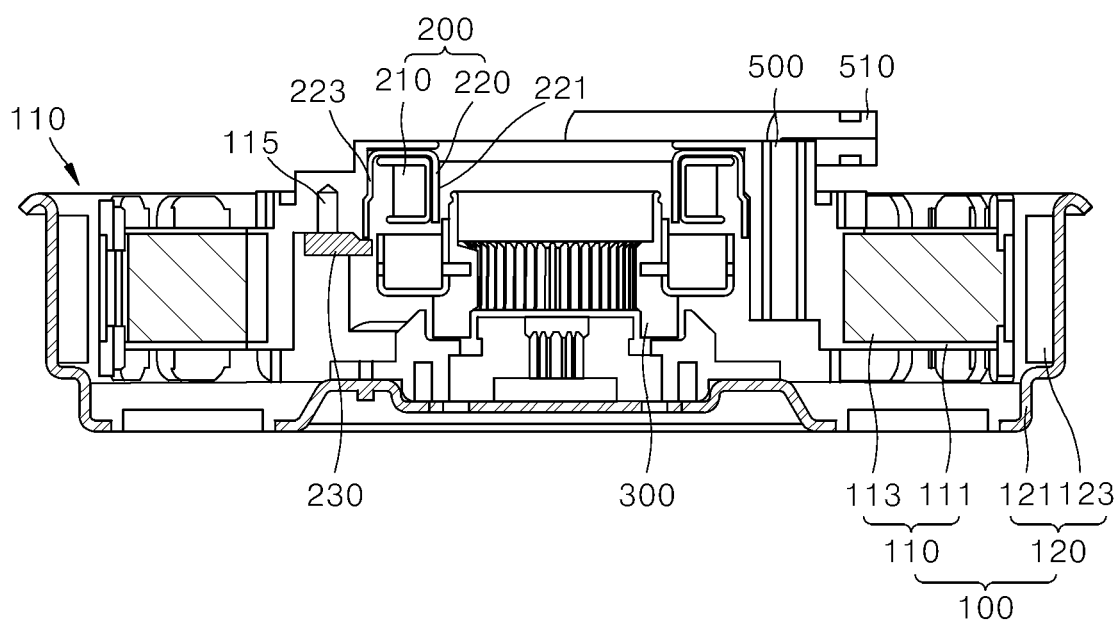
FIG. 4 is a view illustrating an example electronic clutch-coupled motor assembly in an enlarged area "A" of FIG. 3.

Referring to FIG. 4, the electronic clutch 200 may include an electronic clutch insert core 220 and an electronic clutch bobbin 210.

The electronic clutch insert core 220 may have a circular shape, and may be made of a steel material such that the electronic clutch insert core 220 contacts a plurality of portions of the stator core 111 and is press-fitted and coupled to the stator core 111 when the electronic clutch 200 is inserted through the space at the inner center of the stator 110.

The electronic clutch bobbin 210 may denote a bobbin member that is fixed and coupled through an installation space in the circular electronic clutch insert core 220.

The electronic clutch bobbin 210 may be firmly fixed and coupled to an inside of the electronic clutch insert core 220.

The electronic clutch 200 may be press-fitted and coupled to the stator 110 and may be integrated, i.e., modularized, with the motor 100. In relation to this, description is provided with reference to FIGS. 4 and 5 along with description of the electronic clutch 200.

The sun gear shaft 610 may denote a shaft that receives rotational force from the motor 100, specifically, the rotor 120 and that rotates.

The sun gear 600 may be coupled through one end (e.g., an upper end and the like) of the sun gear shaft 610.

A plurality of planetary gears 700 may be disposed to surround an outside of the sun gear 600.

The planetary gear shaft 710 may denote another shaft connecting with the planetary gear 700 that is connected to the sun gear 600 to receive rotational force and to rotate.

A washing machine, to which the driving device 1000 for a washing machine is applied, may further include a bearing housing 800, an inner shaft 910 and an outer shaft 930.

Referring to FIG. 3, the bearing housing 800 may be disposed between a tub and the motor 100. Specifically, the bearing housing 800 may closely contact an upper portion of the motor 100 and may be fixed to a lower portion of the tub.

The bearing housing 800, provided at the above-described position, may further include a plurality of bearings that are disposed to reduce a rotation friction while contacting and supporting the plurality of shafts and the like.

The inner shaft 910 and the outer shaft 930 may be provided to receive rotational force of the motor 100 and may be in charge of output of a washing machine.

The inner shaft 910 and the outer shaft 930 may be installed to create concentricity along with the sun gear shaft 610 and the planetary gear shaft 710.

For example, the inner shaft 910 may be connected to the rotor 120 of the motor 100, and the outer shaft 930 may be optionally connected to the rotor 120 by the electronic clutch 200.

Below, an electronic clutch-coupled motor assembly is described with reference to FIGS. 4 and 5.

Figure 5:
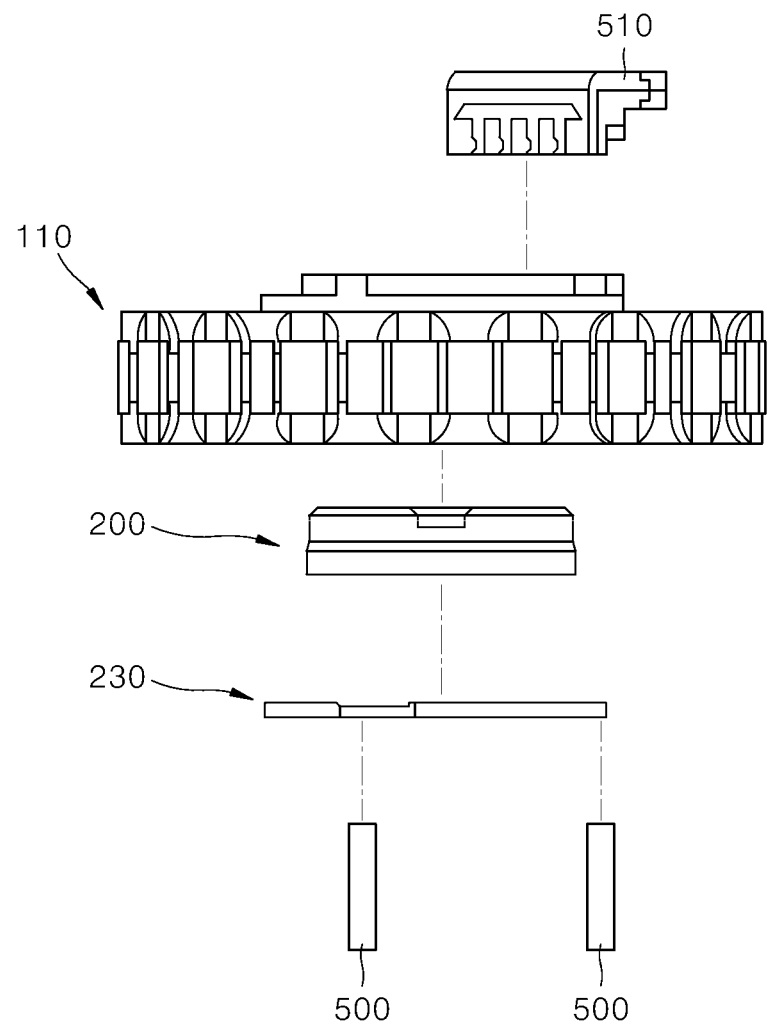
FIG. 5 is a view illustrating an assembly structure of an example electronic clutch-coupled motor assembly.

FIG. 4 is a view illustrating an example electronic clutch-coupled motor assembly, and FIG. 5 is a view illustrating an assembly structure of the electronic clutch-coupled motor assembly.

A motor 100, as illustrated, may include a stator 110 and a rotor 120.

The stator 110 may define a space having a predetermined size at an inner center thereof. The rotor 120 may be spaced a predetermined distance from an outer circumference of the stator 110 and may be disposed to surround the stator 110.

The rotor 120 may be configured to rotate around the stator 110 when power is supplied to the stator 110.

The stator 110 may include a stator core 111 and a plurality of coils 113. The stator core 111 may have a ring shaped-structure in which the stator core 111 is disposed to surround the space at the inner center of the stator 110. The plurality of coils 113 may be arranged through the stator core 111 in a predetermined direction.

The rotor 120 may include a rotor core 121 and a plurality of magnets 123. The rotor core 121 may be formed to surround the stator 110 with a predetermined-sized gap, i.e., an air gap, between the rotor core 121 and the stator 110. The plurality of magnets 123 may be arranged to face the coils 113 of the stator 110 inside the rotor core 121 with the air gap between the magnets 123 and the coils 113 of the stator 110.

The electronic clutch 200 may include an electronic clutch insert core 220 and an electronic clutch bobbin 210.

The electronic clutch insert core 220 may have a circular shape, and when being inserted through the space at the inner center of the stator 110, may contact a plurality of portions of the stator core 111 and may be press-fitted and coupled to the stator core 111.

The electronic clutch bobbin 210 may be installed in the electronic clutch insert core 220. Accordingly, the electronic clutch bobbin 210 may be firmly disposed and fixed onto an inside of the electronic clutch insert core 220.

According to one embodiment, the electronic clutch 200 may be coupled to an inside of the motor 100, and specifically, may be press-fitted into the stator 110 through the space at the inner center of the stator core 111, and after a cover 230 is assembled to the stator 110, may be coupled to the stator 110 through a bolt.

Accordingly, the electronic clutch 200 and the stator 110 may be integrated and modularized.

As long as the electronic clutch 200 is press-fitted and coupled through the space at the inner center of the stator 110 of the motor 100, concentricity of the electronic clutch 200 as well as the concentricity of the motor 100 may be ensured.

Figure 2:
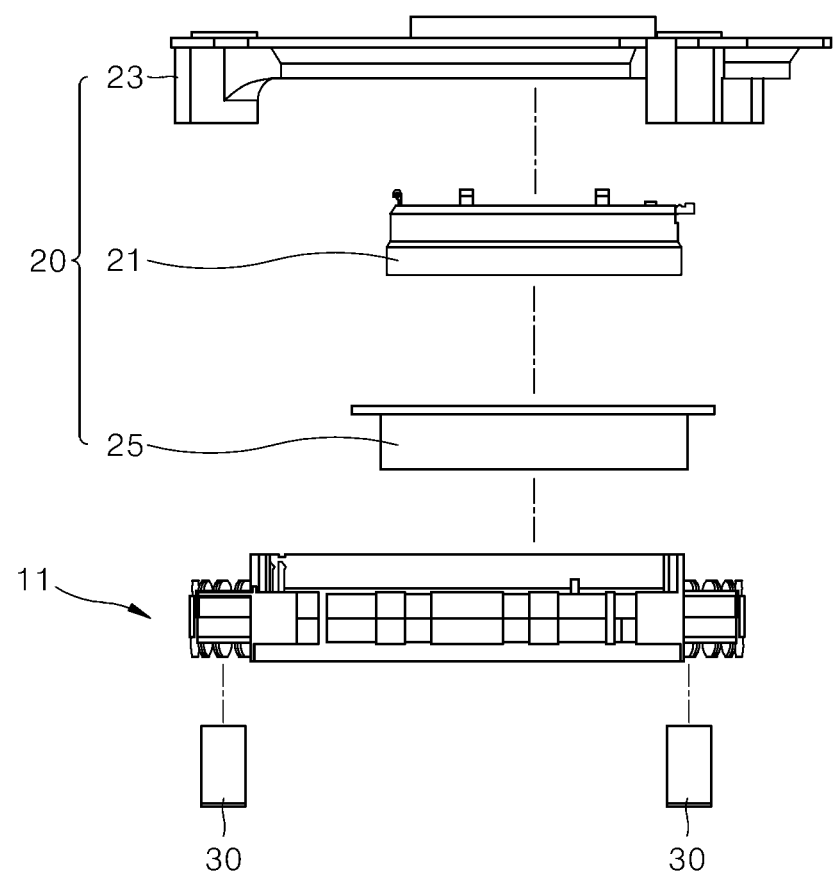
FIG. 2 is a view illustrating an assembly structure of an electronic clutch of a driving device for a washing machine of the related art.

Additionally, an existing component such as electronic clutch upper and lower cases (see 23, 25 in FIG. 2), used to ensure concentricity of an electronic clutch 200 of the related art, may be removed. Further, work for ensuring concentricity of an electronic clutch 200 with a jig is no longer required.

Thus, products may become lightweight, their volume may be reduced, their assembly may be simplified, and costs incurred for raw materials may be reduced.

The electronic clutch 200 may be press-fitted into the stator 110 through the space at the inner center of the stator 110.

In this case, the electronic clutch 200 may be press-fitted into the stator core 111 through a plurality of portions formed in different positions of the stator core 111 at a time and may create concentricity along with the motor 100.

Specifically, the electronic clutch-coupled motor assembly, according to one embodiment, may include a plurality of press-fit parts (referred to as "first and second press-fit parts") where a press fit is done between the electronic clutch 200 and the stator 110.

The first press-fit part 221 denotes a portion where an inside of the electronic clutch insert core 220 in a radial direction thereof and the stator core 111 contact each other and are press-fitted, at the time of a press fit between the electronic clutch 200 and the stator 110.

The second press-fit part 223 denotes a portion where an outside of the electronic clutch insert core 220 in the radial direction thereof and the stator core 111 contact each other and are press-fitted, at the time of a press fit between the electronic clutch 200 and the stator 110.

Referring to FIG. 4, the first press-fit part 221 and the second press-fit part 223 may be disposed to face each other in the electronic clutch insert core 220 with the electronic clutch bobbin 210 therebetween.

Through the first and second press-fit parts 221, 223 formed to face each other at different positions, the electronic clutch 200 may be press-fitted into the stator 110 at the plurality of portions at a time, as described above. Accordingly, the electronic clutch 200 and the stator 110 may be fitted and coupled at predetermined positions. Thus, when concentricity of the stator 110, i.e., the motor 100, is ensured, concentricity of the electronic clutch 200 press-fitted into the stator 110 may also be ensured simultaneously.

According to one embodiment, a cover 230 for fixing the position of the electronic clutch 200, press-fitted into the stator 110 and ensuring concentricity along with the motor 100, may be further included.

The cover 230 may denote a member that closes an open portion of the space of the stator 110, into which the electronic clutch 200 is fitted, to fix the position of the electronic clutch 200 after the press fit between the electronic clutch 200 and the stator 110.

The cover 230 may be coupled to the stator 110.

Specifically, the cover 230 may be coupled to the stator core 111 using at least one bolt.

One or more bolts may be used for the coupling of the cover 230.

A bolt used for the coupling of the cover 230 may be coupled to the stator core 111 near the second press-fit part 223 through at least one coupling groove 115 formed inside the stator core 111.

Since the coupling groove 115 is formed on an outside of the electronic clutch 200 near the second press-fit part 223, the electronic clutch 200 may not be structurally affected by the bolt at all. Further, the press fitting of the electronic clutch 200 and the coupling of the bolt may be performed in a continuous manner, making the coupling of the cover 230 easy.

The electronic clutch 200 may be press-fitted through the space at the inner center of the stator 110, may be fixed by the cover 230 that is coupled through the bolt coupling process, and may ensure concentricity along with the motor 100.

In this case, a height of the space, in which the electronic clutch 200 is press-fitted into the stator 110, may be the same as or greater than a height of the electronic clutch 200, for example.

Since the electronic clutch 200 has a height corresponding to a height of the space, the electronic clutch 200 may be entirely stored inside the space when the electronic clutch 200 is press-fitted into the stator 110. At least part of the electronic clutch 200 may protrude further outwards than the stator 110 and may be provided in the form of a compact module. Accordingly, the electronic clutch 200 and the stator 110 of the motor may overlap and may be coupled like a single component, thereby making it possible to reduce the entire height, volume and size.

According to one embodiment, a power connector 510, which supplies power to the stator 110 of the motor and the electronic clutch 200, may be further included.

As illustrated in FIG. 1, the electronic clutch 20 and the motor 10 of the related art are separated. A power cable, which supplies power respectively to the electronic clutch 20 and the motor 10 of the related art, is provided. Thus, it is difficult to keep the cable neat and tidy.

According to the embodiment of the present disclosure, since the stator 110 of the motor and the electronic clutch 200 may be integrated and modularized, power may be supplied to the stator 110 and the electronic clutch 200 at the same time through a single power connector 510.

An assembly process of an example electronic clutch-coupled motor assembly is described with reference to FIGS. 5 and 6.

An electronic clutch 200 may be press-fitted through a space at an inner center of a stator 110 of a motor 100. In this case, the electronic clutch 200 and a stator core 111 may be press-fitted at a plurality of portions through first and second press-fit parts 221, 223 to be fitted into predetermined positions. Thus, as long as concentricity of the motor 100 is ensured, concentricity of the electronic clutch 200 may also be ensured.

After a cover 230 is assembled to the stator 110, a bolt may be coupled through a coupling groove 115. Then the electronic clutch 200 may be press-fitted and coupled to the center in the stator 110 of the motor 100, and the electronic clutch 200 and the stator 110 may be coupled in an integrated and modularized manner.

A plurality of stoppers 500 may connect up to a bearing housing 800 through the stator core 111.

Figure 6:
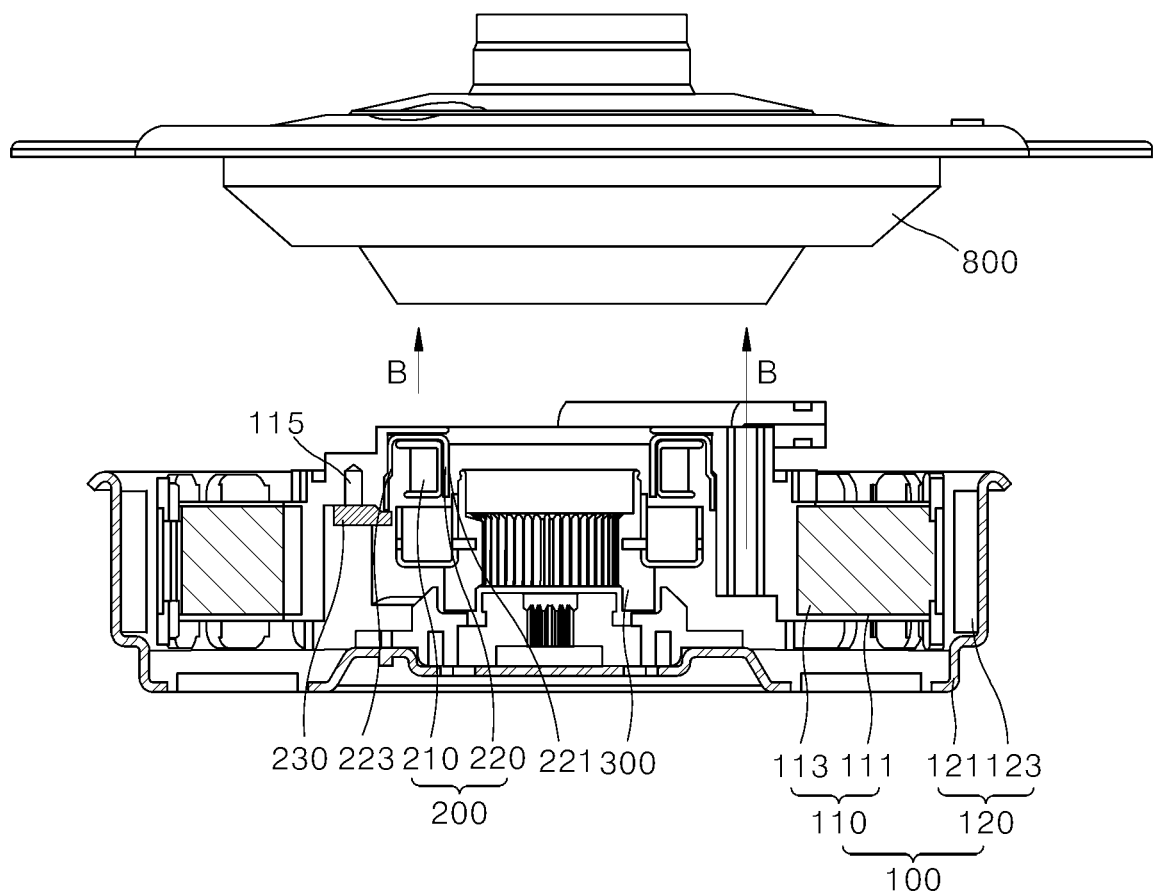
FIG. 6 is a view illustrating an assembly structure of an example driving device for a washing machine.

The plurality of stoppers 500 may be coupled to a lower portion of the bearing housing 800 along a predetermined direction in which the bolt is coupled (B, see FIG. 6).

Accordingly, the motor 100, into which the electronic clutch 200 having ensured concentricity is integrated, may be coupled at a plurality of points of the lower portion of the bearing housing 800 (e.g., a three-point coupling and the like).

A driving device 1000 for a washing machine, including the motor 100 and the electronic clutch 200, may be stably coupled to the lower portion of the bearing housing 800, and power delivery components may be modularized, thereby making it possible to readily ensure concentricity of the electronic clutch 200.

On the basis of the above-described configurations and operations, when concentricity of the motor is ensured with the structure in which an electronic clutch insert core is press-fitted and coupled to the inner center of the stator of the motor, concentricity of the electronic clutch may also be ensured.

Additionally, an existing component, used to ensure concentricity of an electronic clutch, may be removed, and work for ensuring concentricity with an additional jig is not required. Thus, the motor assembly and the driving device for a washing machine may become lightweight, may ensure a reduction in volume, may ensure improvement in productivity and may help save costs.

Further, a power delivery part may be modularized based on the improved structure in which the electronic clutch is integrated into the stator of the motor.

Electronic clutch cases formed at upper and lower portions of the electronic clutch may be removed, and the electronic clutch may be press-fitted and coupled to the inner center of the stator of the motor. As a result, the motor assembly and the driving device for a washing machine may ensure a reduction in volume, may have a compact size and may help save costs incurred for raw materials.

Furthermore, since the electronic clutch and the stator of the motor may be integrated in a compact structure, and a power cable for each of the electronic clutch and the stator of the motor is not required. Instead, a single power supply line may be used to supply power to the electronic clutch and the stator of the motor. Accordingly, the power cable may be kept neat and tidy.

Although the embodiments have been described with reference to a number of illustrative embodiments thereof, it should be understood that the embodiments and drawings in the present disclosure are not limited and that numerous other modifications and embodiments can be devised by those skilled in the art. Additionally, though not explicitly described during description of the embodiments, predictable effects based on the configurations of the embodiments should be acknowledged.

What is claimed is:

1. An electronic clutch-coupled motor assembly, comprising:
    a motor comprising:
        a stator that defines an inner space at a center of the stator, and
        a rotor that surrounds the stator and is spaced apart from an outer circumference of the stator, the rotor being configured to rotate relative to the stator;
    an electronic clutch that is press-fitted into and coupled to the stator through the inner space of the stator, the electronic clutch comprising:
        an electronic clutch insert core having a circular shape, and
        an electronic clutch bobbin coupled to an inside of the electronic clutch insert core; and
    a plurality of fitting portions that are disposed at different positions in the inner space of the stator and press-fitted between an inner surface of the stator and the electronic clutch such that the electric clutch is concentric with the motor.

2. The motor assembly of claim 1, wherein the stator comprises:
    a stator core that has a ring shape and defines the inner space of the stator; and
    a plurality of coils disposed at the stator core.

3. The motor assembly of claim 2, wherein the plurality of fitting portions comprise:
    a first press-fit part that is press-fitted between the stator core and the electronic clutch insert core, the first press-fit part contacting the stator core and the inside of the electronic clutch insert core in a radial direction; and
    a second press-fit part that is press-fitted between the stator core and the electronic clutch insert core, the second press-fit part contacting the stator core and an outside of the electronic clutch insert core in the radial direction.

4. The motor assembly of claim 3, wherein the electronic clutch insert core includes the first press-fit part and the second press-fit part, wherein the first press-fit part and the second press-fit part face each other, and the electronic clutch bobbin is disposed between the first press-fit part and the second press-fit part.

5. The motor assembly of claim 3, further comprising:
    a cover that blocks an open portion in the inner space of the stator and is coupled to the stator to fix a position of the electronic clutch in the inner space of the stator.

6. The motor assembly of claim 5, wherein the stator defines at least one coupling groove at a position facing the second press-fit part, and
    wherein the cover is coupled to the stator by at least one bolt passing through the at least one coupling groove.

7. The motor assembly of claim 1, wherein the rotor comprises:
    a rotor core that surrounds the stator, an air gap being defined between the stator and the rotor core; and
    a plurality of magnets that are disposed inside the rotor core and face a plurality of coils of the stator.

8. The motor assembly of claim 1, wherein a height of the electronic clutch corresponds to a height of the inner space of the stator.

9. The motor assembly of claim 8, wherein an entire portion of the electronic clutch is disposed within the inner space of the stator and surrounded by the stator.

10. The motor assembly of claim 1, further comprising:
    a power connector connected to the stator and the electronic clutch and configured to supply power to the motor and the electronic clutch, the power connector extending through at least a portion of the stator.

11. A driving device for a washing machine, the driving device comprising:
    a motor comprising:
        a stator that defines an inner space at a center of the stator, and
        a rotor that surrounds the stator and is spaced apart from an outer circumference of the stator, the rotor being configured to rotate relative to the stator;
    an electronic clutch that is press-fitted into and coupled to the stator through the inner space, the electronic clutch comprising:
        an electronic clutch insert core having a circular shape, and
        an electronic clutch bobbin coupled to an inside of the electronic clutch insert core;
    a sun gear shaft configured to receive rotational force from the motor and to rotate based on the rotational force from the motor;
    a sun gear coupled to an upper end of the sun gear shaft;
    a plurality of planetary gears that surround an outside of the sun gear;
    a planetary gear shaft configured to receive rotational force from the plurality of planetary gears and to rotate based on the rotational force from the plurality of planetary gears; and
    a plurality of fitting portions that are disposed at different positions in the inner space of the stator and press-fitted between an inner surface of the stator and the electronic clutch such that the electric clutch is concentric with the motor.

12. The driving device of claim 11, wherein the stator comprises:
    a stator core that has a ring shape and defines the inner space of the stator; and
    a plurality of coils disposed at the stator core, and
    wherein the rotor comprises:

a rotor core that surrounds the stator, an air gap being defined between the stator and the rotor core, and a plurality of magnets that are disposed inside the rotor core and face the plurality of coils of the stator.

13. The driving device of claim 12, wherein the plurality of fitting portions comprise:

a first press-fit part that is press-fitted between the stator core and the electronic clutch insert core, the first press-fit part contacting the stator core and the inside of the electronic clutch insert core in a radial direction; and a second press-fit part that is press-fitted between the stator core and the electronic clutch insert core, the second press-fit part contacting the stator core and an outside of the electronic clutch insert core in the radial direction.

14. The driving device of claim 13, wherein the electronic clutch insert core includes the first press-fit part and the second press-fit part, and wherein the first press-fit part and the second press-fit part face each other, and the electronic clutch bobbin is disposed between the first press-fit part and the second press-fit part.

15. The driving device of claim 13, further comprising:

a cover that blocks an open portion in the inner space and is coupled to the stator to fix a position of the electronic clutch in the inner space of the stator.

16. The driving device of claim 15, wherein the stator core defines at least one coupling groove at a position facing the second press-fit part, and wherein the cover is coupled to the stator core by at least one bolt passing through the at least one coupling groove.

17. The driving device of claim 16, further comprising:

a plurality of stoppers connected to the stator and a bearing housing of the washing machine, the plurality of stoppers being coupled to the stator and the bearing housing through the stator core.

18. The driving device of claim 11, wherein a height of the electronic clutch corresponds to a height of the inner space of the stator, and wherein an entire portion of the electronic clutch is disposed within the inner space of the stator and surrounded by the stator.

* * * * *